(12) United States Patent
Thompson et al.

(10) Patent No.: US 11,413,811 B2
(45) Date of Patent: Aug. 16, 2022

(54) METHOD AND APPARATUS FOR SEPARATION OF CURED RESIN LAYER FROM RESIN SUPPORT IN ADDITIVE MANUFACTURING

(71) Applicant: General Electric Company, Schenectady, NY (US)

(72) Inventors: Mary Kathryn Thompson, Hamilton, OH (US); Meredith Elissa Dubelman, West Chester, OH (US); Christopher Barnhill, Cincinnati, OH (US); Xi Yang, West Chester, OH (US)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 16/542,522

(22) Filed: Aug. 16, 2019

(65) Prior Publication Data

US 2021/0046695 A1    Feb. 18, 2021

(51) Int. Cl.
*B29C 64/147* (2017.01)
*B29C 64/124* (2017.01)
(Continued)

(52) U.S. Cl.
CPC .......... *B29C 64/124* (2017.08); *B29C 64/218* (2017.08); *B29C 64/223* (2017.08);
(Continued)

(58) Field of Classification Search
CPC ............................ B29C 64/129; B29C 64/147
See application file for complete search history.

(56) References Cited

U.S. PATENT DOCUMENTS 4,752,498 A    6/1988 Fudim
5,096,530 A    3/1992 Cohen
(Continued)

FOREIGN PATENT DOCUMENTS

CN    101119808 A    2/2008
JP    2002370286    12/2002
(Continued)

OTHER PUBLICATIONS

Rezaee et al, Quantitative peel test for thin films/layers based on a coupled parametric and statistical study, 2019, Nature, Scientific Reports, 9, 19805 (Year: 2019).*
(Continued)

*Primary Examiner* — Timothy Kennedy
(74) *Attorney, Agent, or Firm* — Dinsmore & Shohl LLP (57) ABSTRACT

An additive manufacturing apparatus configured to produce a component layer by layer. The manufacturing apparatus includes a support structure, a stage that is positioned opposite the support structure. The stage is configured to hold a stacked arrangement of one or more cured layers of a resin. The apparatus also includes one or more actuators operable to move the stage away from the support structure, and a radiant energy apparatus is positioned opposite the stage such that the support structure is positioned between the radiant energy apparatus and the stage. The radiant energy apparatus is operable to generate and project radiant energy through the support structure on the resin in a predetermined pattern. a foil separation device that includes at least one holddown device is configured such that the foil contacts the at least one holddown device as the stage is moved away from the support structure.

27 Claims, 9 Drawing Sheets

(51) Int. Cl.
  *B29C 64/245* (2017.01)
  *B29C 64/232* (2017.01)
  *B29C 64/223* (2017.01)
  *B29C 64/218* (2017.01)
  *B29C 64/264* (2017.01)
  *B33Y 30/00* (2015.01)
  *B33Y 10/00* (2015.01)

(52) U.S. Cl.
  CPC .......... *B29C 64/232* (2017.08); *B29C 64/245* (2017.08); *B29C 64/264* (2017.08); *B33Y 10/00* (2014.12); *B33Y 30/00* (2014.12)

(56) References Cited

U.S. PATENT DOCUMENTS

| | | | |
|---|---|---|---|
| 5,447,822 | A | 9/1995 | Hull et al. |
| 5,650,260 | A | 7/1997 | Onishi |
| 7,052,263 | B2 | 5/2006 | John |
| 7,195,472 | B2 | 3/2007 | John |
| 7,438,846 | B2 | 10/2008 | John |
| 7,845,930 | B2 | 12/2010 | Shkolnik et al. |
| 8,003,040 | B2 | 8/2011 | El-Siblani |
| 8,110,135 | B2 | 2/2012 | El-Siblani |
| 8,326,024 | B2 | 12/2012 | Shkolnik |
| 8,372,330 | B2 | 2/2013 | El-Siblani et al. |
| 8,394,313 | B2 | 3/2013 | El-Siblani et al. |
| 8,623,264 | B2 | 1/2014 | Rohner et al. |
| 8,658,076 | B2 | 2/2014 | El-Siblani |
| 8,741,203 | B2 | 6/2014 | Liska et al. |
| 8,801,418 | B2 | 8/2014 | El-Siblani et al. |
| 8,845,316 | B2 | 9/2014 | Schillen et al. |
| 8,994,592 | B2 * | 3/2015 | Scott .................... B29C 64/268 343/705 |
| 9,067,359 | B2 | 6/2015 | Rohner et al. |
| 9,067,361 | B2 | 6/2015 | El-Siblani |
| 9,434,107 | B2 | 9/2016 | Zenere |
| 9,446,557 | B2 | 9/2016 | Zenere et al. |
| 9,486,944 | B2 | 11/2016 | El-Siblani et al. |
| 9,636,873 | B2 | 5/2017 | Joyce |
| 9,895,843 | B2 | 2/2018 | Lobovsky et al. |
| 10,011,076 | B2 | 7/2018 | El-Siblani et al. |
| 2011/0089610 | A1 | 4/2011 | El-Siblani et al. |
| 2012/0007287 | A1 | 1/2012 | Vermeer et al. |
| 2013/0140741 | A1 | 6/2013 | El-Siblani et al. |
| 2013/0213567 | A1 | 8/2013 | Jamar et al. |
| 2013/0241113 | A1 | 9/2013 | Geers et al. |
| 2014/0239554 | A1 | 8/2014 | El-Siblani |
| 2014/0246813 | A1 | 9/2014 | Bauman et al. |
| 2014/0353878 | A1 | 12/2014 | Driessen et al. |
| 2015/0231828 | A1 | 8/2015 | El-Siblani et al. |
| 2015/0231831 | A1 | 8/2015 | El-Siblani |
| 2015/0246487 | A1 | 9/2015 | Tl-Siblani |
| 2015/0314578 | A1 * | 11/2015 | Taniuchi ................. B32B 37/26 156/499 |
| 2015/0321421 | A1 | 11/2015 | Ding |
| 2016/0016361 | A1 | 1/2016 | Lobovsky et al. |
| 2016/0046075 | A1 | 2/2016 | DeSimone et al. |
| 2016/0046080 | A1 | 2/2016 | Thomas et al. |
| 2016/0052205 | A1 | 2/2016 | FrantzDale |
| 2016/0059484 | A1 | 3/2016 | DeSimone et al. |
| 2016/0082671 | A1 | 3/2016 | Joyce |
| 2016/0107340 | A1 | 4/2016 | Joyce |
| 2016/0332386 | A1 | 11/2016 | Kuijpers |
| 2017/0021562 | A1 | 1/2017 | El-Siblani et al. |
| 2017/0066185 | A1 | 3/2017 | Ermoshkin et al. |
| 2017/0080641 | A1 | 3/2017 | El-Siblani |
| 2017/0291355 | A1 * | 10/2017 | Zhang ..................... B29C 64/20 |
| 2018/0200948 | A1 | 7/2018 | Kuijpers et al. |
| 2019/0202121 | A1 * | 7/2019 | Budge ..................... B29C 64/10 |
| 2019/0263054 | A1 * | 8/2019 | Kotler .................. B29C 64/218 |

FOREIGN PATENT DOCUMENTS

| | | |
|---|---|---|
| JP | 2003039564 | 2/2003 |
| WO | 2015107066 A1 | 7/2015 |
| WO | 2017009368 | 1/2017 |

OTHER PUBLICATIONS

European Extended Search Report for EP Application No. 20188745.2 dated Mar. 24, 2021 (9 pages).
First Chinese Office Action for Appln No. 202010824235.8 dated Jan. 25, 2022 (22 pages with English Translation).

* cited by examiner

METHOD AND APPARATUS FOR SEPARATION OF CURED RESIN LAYER FROM RESIN SUPPORT IN ADDITIVE MANUFACTURING

BACKGROUND OF THE INVENTION

This invention relates generally to additive manufacturing, and more particularly to an apparatus and method for separating a cured resin layer from a resin support in additive manufacturing.

Additive manufacturing is a process in which material is built up layer-by-layer to form a component. Stereolithography is a type of additive manufacturing process which employs a tank of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer. Other types of additive manufacturing processes utilize other types of radiant energy sources to solidify patterns in resin.

Another prior art method is a so-called "tape casting" process. In this process, a resin is deposited onto a flexible radiotransparent tape that is fed out from a supply reel. An upper plate lowers on to the resin, compressing it between the tape and the upper plate and defining a layer thickness. Radiant energy is used to cure the resin through the radiotransparent tape. Once the curing of the first layer is complete, the upper plate is retracted upwards, taking the cured material with it in a separating step during which the tape, or foil, is pulled away from the newly formed layer. The tape is then advanced to expose a fresh clean section, ready for additional resin.

The newly cured layer of resin can be attached to the foil layer by forces such as adhesion or vacuum such that the newly cured layer is not readily separated, thus the final part can be distorted, damaged, or incomplete during the separating step. Therefore, it is desirable to promote separation and control foil or tape lift off during the separating step.

BRIEF DESCRIPTION OF THE INVENTION

At least one of these problems is addressed by an additive manufacturing apparatus that controls the foil or tape lift off during part separation in an additive manufacturing process by adding one or more points of restraint to restrict movement of the foil away from the resin support.

According to one aspect of the technology disclosed herein, an additive manufacturing apparatus configured to produce a component layer by layer. The manufacturing apparatus includes a support structure, a stage that is positioned opposite the support structure. The stage is configured to hold a stacked arrangement of one or more cured layers of a resin. The apparatus also includes one or more actuators operable to move the stage away from the support structure, and a radiant energy apparatus that is positioned opposite the stage such that the support structure is positioned between the radiant energy apparatus and the stage. The radiant energy apparatus is operable to generate and project radiant energy through the support structure on the resin in a predetermined pattern. A foil separation device that includes at least one holddown device is configured such that the foil contacts the at least one holddown device as the stage is moved away from the support structure.

According to one aspect of the technology described herein, a method is provided for operating an additive manufacturing apparatus that includes a stage, a support structure, a foil that extends between the stage and the support structure and that defines a build surface and a foil separation device. The method includes the following steps: performing an additive manufacturing cycle including the following steps: depositing an uncured layer of resin onto the build surface such that it defines a resin surface; moving the stage such that a working surface contacts the resin surface; curing at least a portion of the uncured layer of resin to create a newly cured layer; and moving the stage and thus, the newly cured layer, away from the support structure; operating the foil separation device to separate the newly cured layer from the build surface.

According to another aspect of the technology described herein, an additive manufacturing apparatus configured to produce a component layer by layer. The apparatus includes a support structure, a stage positioned opposite the support structure and configured to hold a stacked arrangement of one or more cured layers of the resin, and one or more actuators operable to move the stage away from the support structure. A material depositor is operable to deposit a resin that is curable onto a build surface. A radiant energy apparatus is positioned opposite the stage such that the support structure is positioned between the radiant energy apparatus and the stage. A foil extends between the support structure and the stage. A build surface is defined by the foil and is positioned such that it faces the stage. The radiant energy apparatus is operable to generate and project radiant energy through the support structure and the foil on the resin in a predetermined pattern. A foil separation device is positioned between the stage and the support structure. The foil separation device includes a first holddown device and a second holddown device that are configured such that a remaining structure contacts the first holddown device and the second holddown device when the stage is moved away from the support structure.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
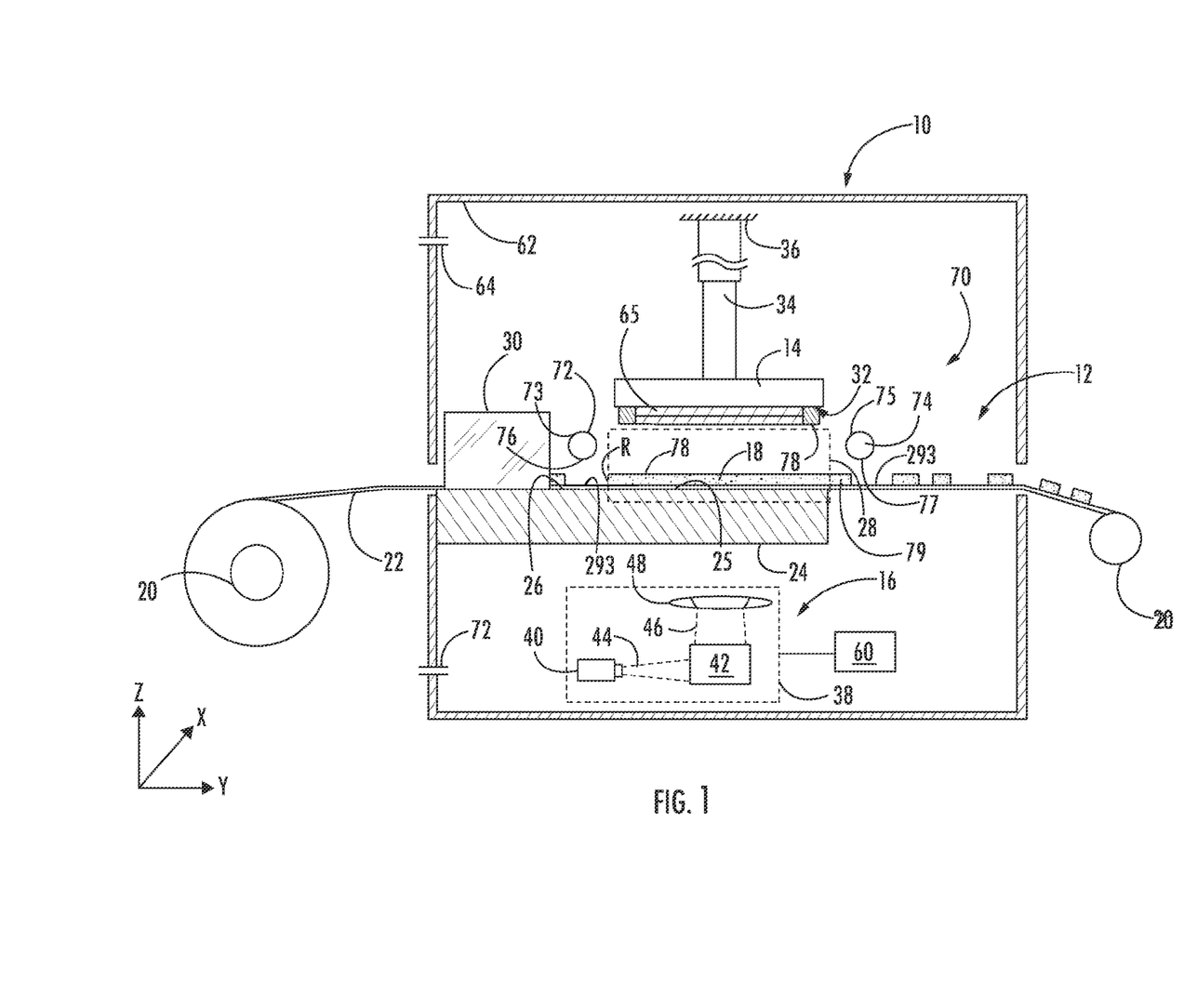
FIG. 1 is a schematic side view of an exemplary additive manufacturing apparatus.

Referring to the drawings wherein identical reference numerals denote the same elements throughout the various views, FIG. 1 illustrates schematically an example of one type of suitable apparatus 10 for carrying out an embodiment of an additive manufacturing method as described herein. It will be understood that other configurations of equipment may be used to carry out the method. Basic components of the exemplary apparatus 10 include a resin handling assembly 12, a stage 14, a radiant energy apparatus 16, and a foil separation apparatus 70.

As will be described further below, the foil separation apparatus 70 is configured to restrict movement of a foil in a direction away from a support structure. The foil separation apparatus 70 is configured to apply a force by movement of the stage 14 to the foil 22 that is opposite to the force applied to the foil 22 via cured layers of the part 65 that are attached to the stage 14. In this manner, a fulcrum is developed to aid in peeling of the foil 22 away from the cured part 65 and the separation of the cured part from the foil 22 can be achieved more efficiently than conventional systems.

In the illustrated example, the resin handling assembly 12 is a "tape casting"-type device. The resin handling assembly 12 includes a first driven roller 20 and a second driven roller 21 that are spaced-apart with a flexible polymeric tape or foil 22 extending therebetween. A portion of the foil 22 is supported from underneath by a support plate 24 and support plate 24 includes a surface 25. Suitable mechanical supports (frames, brackets, etc.—not shown) would be provided for the rollers 20 and 21, support plate 24, and the foil separation apparatus 70. The foil 22 is an example of a "resin support". Each of the first driven roller 20 in the second driven roller 21 are driving the attached to the drive system configured to control the speed and direction of the first driven roller 20 in the second driven roller 21 such that the desired tension and speed is maintained in the film 22. By way of example and not limitation, an appropriate drive system (not shown) would be one understood by one skilled in the art such as individual stepper motors associated with each of the first driven roller 20 and the second driven roller 21.

Both of the support plate 24 and the foil 22 are transparent or include a portion or portions that are transparent. As used herein, the term "transparent" refers to a material which allows radiant energy of a selected wavelength to pass through. For example, as described below, the radiant energy used for curing could be ultraviolet light or laser light in the visible spectrum. Non-limiting examples of transparent materials include polymers, glass, and crystalline minerals such as sapphire or quartz.

Appropriate means such as motors, actuators, feedback sensors, and/or controls of a known type (not shown) would be provided for driving the rollers 20 and 21 in such a manner so as to maintain the foil 22 tensioned between the rollers 20 and 21 and to wind the foil 22 from the first driven roller 20 to the second driven roller 21. As will be described below, a method is provided for affecting the separation process of peeling by manipulating the tension and controlling the tension in the foil 22 via operation of driven rollers 20 and 21.

The foil 22 extending between the rollers 20 and 21 define a "build surface" 26 which is shown as being planar, but could alternatively be arcuate (depending on the shape of the support plate). For purposes of convenient description, the build surface 26 may be considered to be oriented parallel to an X-Y plane of the apparatus 10, and a direction perpendicular to the X-Y plane is denoted as a Z-direction (X, Y, and Z being three mutually perpendicular directions). As used herein, the x-axis refers to the transverse direction (TD) across the width of the foil 22. As used herein, the y-axis refers to the machine direction (MD) along the length of the foil 22 and generally perpendicular to the transverse direction.

The build surface 26 may be configured to be "non-stick", that is, resistant to adhesion of cured resin. The non-stick properties may be embodied by a combination of variables such as the chemistry of the foil 22, its surface finish, and/or applied coatings. In one example, a permanent or semi-permanent non-stick coating may be applied. One non-limiting example of a suitable coating is polytetrafluoroethylene ("PTFE"). In one example, all or a portion of the build surface 26 may incorporate a controlled roughness or surface texture (e.g. protrusions, dimples, grooves, ridges, etc.) with nonstick properties. In one example, the foil 22 may be made in whole or in part from an oxygen-permeable material.

For reference purposes, an area or volume immediately surrounding the location of the foil 22 is defined as a "build zone", labeled 28.

Some means are provided for applying or depositing resin R to the build surface 26 in a generally uniform layer. FIG. 1 shows schematically a material depositor 30 which would be understood to include a reservoir for material communicating with the material outlet such as a slot or aperture (not shown). Conventional means such as a doctor blade (not shown) may be used to control the thickness of resin R applied to the foil 22, as the foil 22 passes under the material depositor 30.

The stage 14 is a structure defining a planar upper surface 32 which is capable of being oriented parallel to the build surface 26. Some means are provided for moving the stage 14 relative to the resin handling assembly 12 parallel to the Z-direction. In FIG. 1, the movement means are depicted schematically as a simple vertical actuator 34 connected between the stage 14 and a static support 36, with the understanding that devices such as ballscrew electric actuators, linear electric actuators, pneumatic cylinders, hydraulic cylinders, or delta drives may be used for this purpose. In addition to, or as an alternative to, making the stage 14 movable, the foil 22 could be movable parallel to the Z-direction.

The radiant energy apparatus 16 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 16 may comprise a "projector" 38, used herein generally to refer to any device operable to generate a radiant energy patterned image of suitable energy level and other operating characteristics to cure the resin R. As used herein, the term "patterned image" refers to a projection of radiant energy comprising an array of individual pixels. Non-limiting examples of patterned imaged devices include a DLP projector or another digital micromirror device, a 2D array of LEDs, a 2D array of lasers, or optically addressed light valves. In the illustrated example, the projector 38 includes a radiant energy source 40 such as a UV lamp, an image forming apparatus 42 operable to receive a source beam 44 from the radiant energy source and generate a patterned image 46 to be projected onto the surface of the resin R, and optionally focusing optics 48, such as one or more lenses.

The radiant energy source 40 may comprise any device operable to generate a beam of suitable energy level and frequency characteristics to cure the resin R. In the illustrated example, the radiant energy source comprises a UV flash lamp.

The image forming apparatus 42 may include one or more mirrors, prisms, and/or lenses and is provided with suitable actuators, and arranged so that the source beam 44 from the radiant energy source 40 can be transformed into a pixelated image in an X-Y plane coincident with the surface of the resin R. In the illustrated example, the image forming apparatus 42 may be a digital micro-mirror device. For example, the projector 38 may be a commercially-available Digital Light Processing ("DLP") projector.

As an option, the projector 38 may incorporate additional means (not shown) such as actuators, mirrors, etc. configured to selectively move the image forming apparatus or other part of the projector 38, with the effect of rastering or shifting the location of the patterned image on the build surface 26. Stated another way, the patterned image may be moved away from a nominal or starting location. This permits a single image forming apparatus to cover a larger build area, for example. Means for mastering or shifting the patterned image from the image forming apparatus are commercially available. This type of image projection may be referred to herein as a "tiled image".

Figure 14:
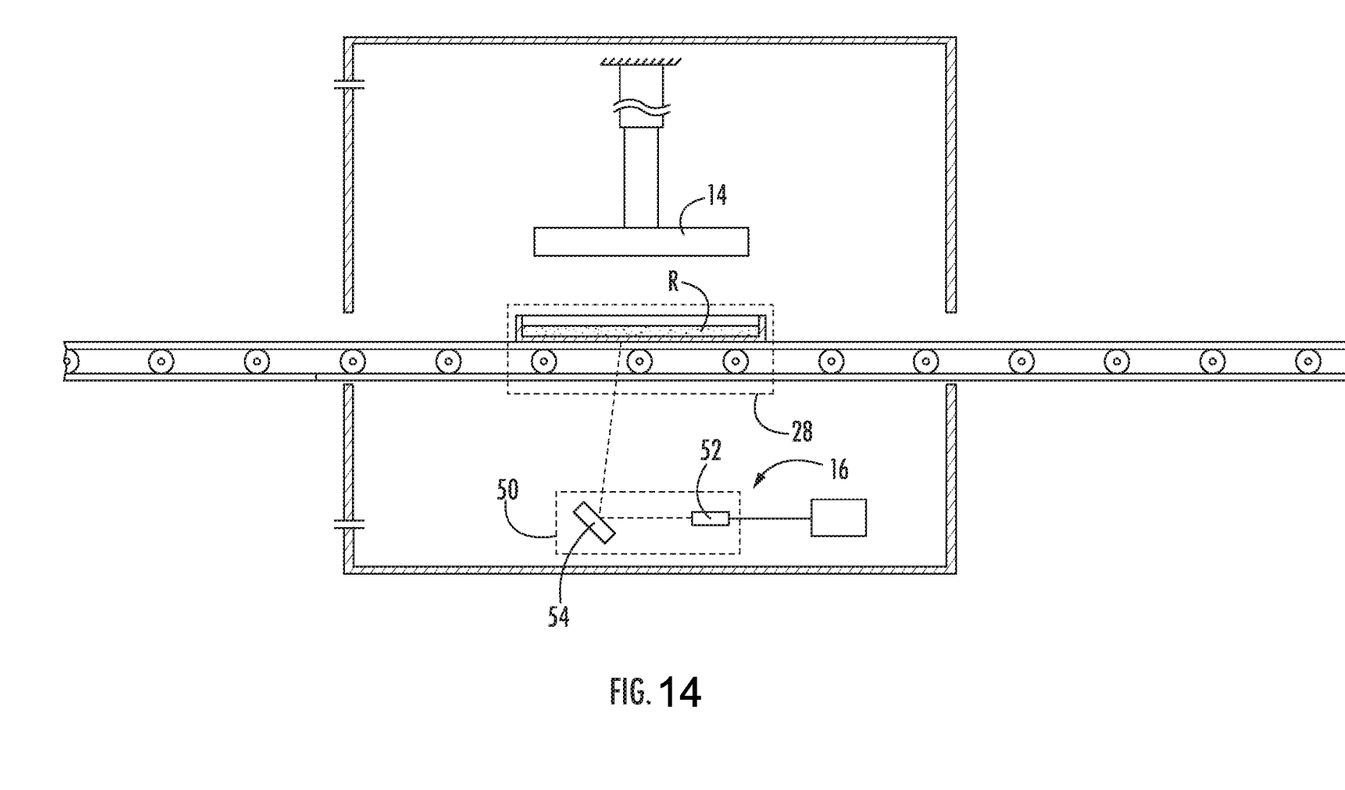
FIG. 14 shows an alternative configuration of the curing apparatus.

In another exemplary embodiment as shown in FIG. 14, in addition to other types of radiant energy devices, the radiant energy apparatus 16 may comprise a "scanned beam apparatus" 50 used herein to refer generally to any device operable to generate a radiant energy beam of suitable energy level and other operating characteristics to cure the resin R and to scan the beam over the surface of the resin R in a desired pattern. In the illustrated example, the scanned beam apparatus 50 comprises a radiant energy source 52 and a beam steering apparatus 54.

The radiant energy source 52 may comprise any device operable to generate a beam of suitable power and other operating characteristics to cure the resin R. Non-limiting examples of suitable radiant energy sources include lasers or electron beam guns.

The beam steering apparatus 54 may include one or more mirrors, prisms, and/or lenses and may be provided with suitable actuators, and arranged so that a beam 56 from the radiant energy source 52 can be focused to a desired spot size and steered to a desired position in plane coincident with the surface of the resin. The beam 56 may be referred to herein as a "build beam". Other types of scanned beam apparatus may be used. For example, scanned beam sources using multiple build beams are known, as are scanned beam sources in which the radiant energy source itself is movable by way of one or more actuators.

Referring now to the separation structure 70, in the illustrated embodiment shown in FIG. 1, the separation structure 70 includes a first holddown device 72 and a second holddown device 74. The first and second holddown devices 72 and 74 include contact surfaces 73 and 75 respectively. The contact surfaces 73 and 75 each define contact locations 76 and 77 respectively. The contact locations 76 and 77 are positioned such that they are at the closest location defined by the contact surfaces 73 and 75 relative to the support structure 24. In the illustrated embodiment, the holddown devices 72 and 74 are rollers and thus can rotate about a horizontal axis such that different points along the contact surfaces 73 and 75 can function as the contact locations 76 and 77. Support structure (not shown) is provided to position the holddown devices 72 and 74 as desired relative to the stage 14 and the support structure 24.

The contact locations 76 and 77 are configured such that they are spaced away from the resin surface 78 and the surface 26 of the foil 22 during normal operation. In this regard, as will be discussed below, remaining portions, if any, of the resin layer 78 and the foil 22 define a remaining structure 79 after the curing step described below. It should be appreciated that the remaining structure 79 can include only foil 22 without of the resin layer 78.

The holddown devices 72 and 74 are positioned such that the contact locations 76 and 77 are spaced apart from the surface 25 of the support structure 24 a distance A. In the illustrated embodiment, the distance A is greater than the thickness of the combination of the thicknesses of the resin layer 78 and the foil 22. In other embodiments, the distance A is less than the thickness of the combination of the thickness of the resin layer 78 and the thickness of the foil 22 but greater than the thickness of the foil 22. It should be appreciated that the distance a can be equal to the thickness of the foil 22 such that the holddown devices 72 and 74 are in contact with the foil 22 at the beginning of the separation process.

The apparatus 10 may include a controller 60. The controller 60 in FIG. 1 is a generalized representation of the hardware and software required to control the operation of the apparatus 10, including some or all of the resin handling assembly 12, the stage 14, the radiant energy apparatus 16, the foil separation device 70, and the various actuators described above. The controller 60 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control. For example, sensors could be used to monitor position, displacement, or movement of any of the components. Process sensors could be used to monitor output power or frequency characteristics of the radiant energy apparatus 16, or forces acting on the apparatus (e.g., stage 14 or foil 22). Imaging sensors (e.g. machine vision) could be used to observe the deposition process, curing process. Information from any of the sensors could be used to monitor, control, or automate some or all of the operation of the apparatus 10, in conjunction with appropriate programming of the controller 60.

Optionally, the components of the apparatus 10 may be surrounded by a housing 62, which may be used to provide a shielding or inert gas atmosphere using gas ports 64. Optionally, pressure within the housing could be maintained at a desired level greater than or less than atmospheric. Optionally, the housing could be temperature and/or humidity controlled. Optionally, ventilation of the housing could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form including a paste or slurry.

The resin R is preferably a relatively high viscosity fluid that will not "slump" or run off during the build process. The composition of the resin R may be selected as desired to suit a particular application. Mixtures of different compositions may be used.

The resin R may be selected to have the ability to out-gas or burn off during further processing, such as the sintering process described below.

The resin R may incorporate a filler. The filler may be pre-mixed with resin R, then loaded into the material depositor 30. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In one example, the filler composition may be selected for its electrical or electromagnetic properties, e.g. it may specifically be an electrical insulator, a dielectric material, or an electrical conductor. It may be magnetic.

The filler may be "fusible", meaning it is capable of consolidation into a mass upon via application of sufficient energy. For example, fusibility is a characteristic of many available powders including but not limited to: polymeric, ceramic, glass, and metallic.

The proportion of filler to resin R may be selected to suit a particular application. Generally, any amount of filler may be used so long as the combined material is capable of flowing and being leveled, and there is sufficient resin R to hold together the particles of the filler in the cured state.

Examples of the operation of the apparatus 10 will now be described in detail with reference to FIG. 1. It will be understood that, as a precursor to producing a component and using the apparatus 10, a component 65 is software modeled. e.g., in terms of a tool (energy source raster) path or as a stack of planar layers arrayed along the Z-axis. Depending on the type of curing method used, each layer may be divided into a grid of pixels. The actual component 65 may be modeled and/or manufactured as a stack of dozens or hundreds of layers. Suitable software modeling processes are known in the art.

Initially, the build zone 28 is prepared with resin R on the build surface 26. For example, the material depositor 30 may be used to deposit resin R over the build surface 26 of the foil 22.

After the material is deposited, the apparatus 10 (or parts thereof) is configured or positioned to define a selected layer increment relative the build surface 26. The layer increment is defined by some combination of the thickness to which the resin R is applied and the operation of the stage 14. For example, the stage 14 could be positioned such that the upper surface 32 is just touching the applied resin R, or the stage 14 could be used to compress and displace the resin R to positively define the layer increment. The layer increment affects the speed of the additive manufacturing process and the resolution of the component 65. The layer increment can be variable, with a larger layer increment being used to speed the process in portions of a component 65 not requiring high accuracy, and a smaller layer increment being used where higher accuracy is required, at the expense of process speed.

Once the resin R has been applied and the layer increment defined, the radiant energy apparatus 16 is used to cure a two-dimensional cross-section or layer of the component 65 being built.

Where a projector 38 is used, the projector 38 projects a patterned image representative of the cross-section of the component 65 through the support plate 24 and foil 22 to the resin R. This process is referred to herein as "selective" curing. It will be understood that photopolymers undergo degrees of curing. In many cases, the radiant energy apparatus 16 would not fully cure the resin R. Rather, it would partially cure the resin R enough to "gel" and then a post-cure process (described below) would cure the resin R to whatever completeness it can reach. It will also be understood that, when a multi-layer component is made using this type of resin R, the energy output of the radiant energy apparatus 16 may be carefully selected to partially cure or "under-cure" a previous layer, with the expectation that when the subsequent layer is applied, the energy from that next layer will further the curing of the previous layer. In the process described herein, the term "curing" or "cured" may be used to refer to partially-cured or completely-cured resin R. During the curing process, radiant energy may be supplied to a given layer in multiple steps (e.g. multiple flashes) and also may be supplied in multiple different patterns for a given layer. This allows different amounts of energy to be applied to different parts of a layer.

Once curing of the first layer is complete, the stage 14 is moved away from the build surface 26, for example by raising the stage 14 using the vertical actuator 34 during a separation process. In the separation process, the build surface 26 of the foil 22 is separated from the cured resin R. It will be understood that the resin R and/or cured layer do not necessarily join, stick, or bond with the build surface 26. Accordingly, as used herein the term "separate" refers to the process of moving two elements apart from each other and does not necessarily imply the act of breaking a bond or detaching one element from another.

Figure 2:
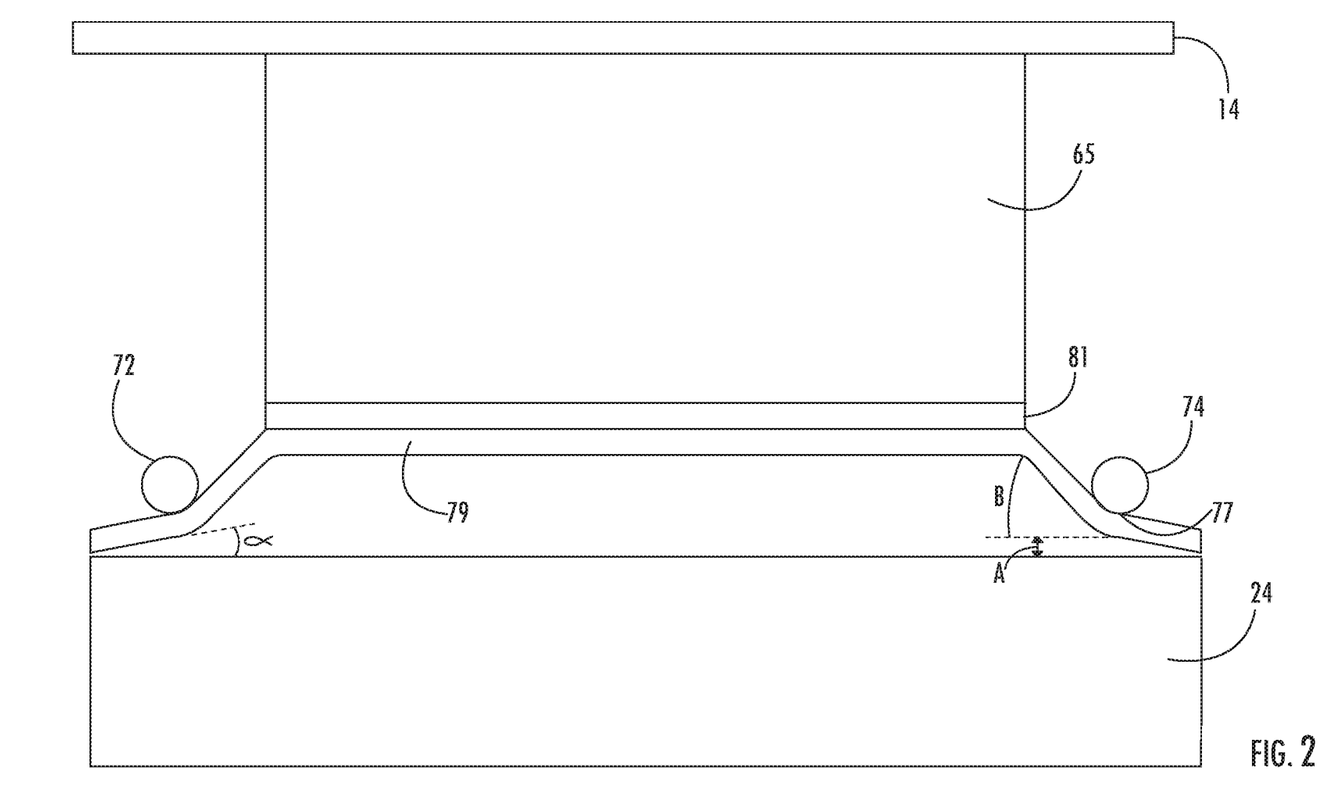
FIG. 2 is a schematic view of a portion of the manufacturing apparatus of FIG. 1 during a separation process.
Figure 3:
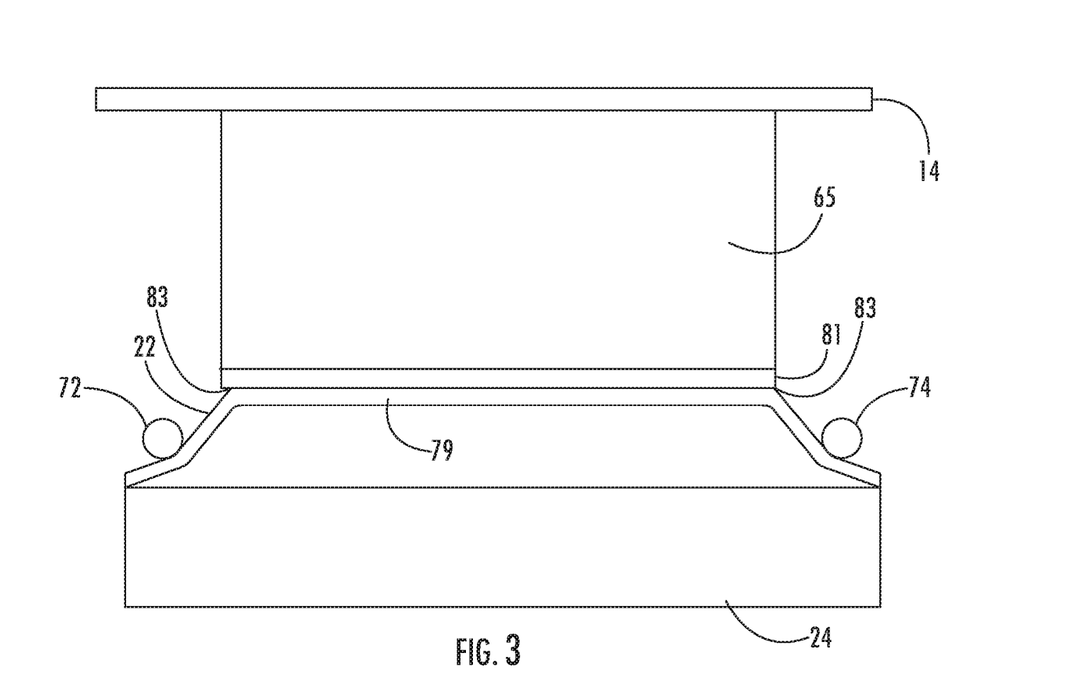
FIG. 3 is a schematic view of a portion of the manufacturing apparatus of FIG. 1 during a separation process.
Figure 4:
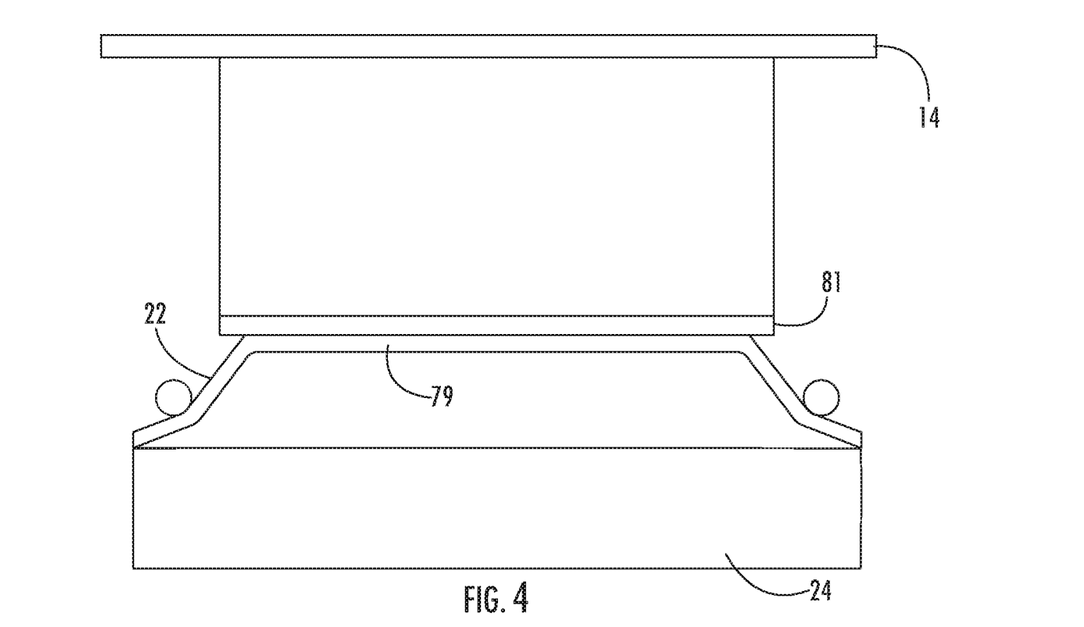
FIG. 4 is a schematic view of a portion of the manufacturing apparatus of FIG. 1 during a separation process.

Referring now to FIG. 2-4, during the separation process the stage 14 is raised away from the support structure 24 as noted above. The recently cured the resin layer 81 still attached to the foil 22 moves away from the support structure 24 in concert with the movement of the stage 14 and the part 65. This action causes an upper surface of the remaining structure 79 to approach and eventually contact the holddown devices 72 and 74 at the contact locations 76 and 77. A pair of peeling locations 83 can be defined before or after the surface of the remaining structure 79 has contacted the holddown devices 72 and 74. An initial angle α is defined as the stage 14 moves away from the support structure 24. The initial angle α increases until contact is made with the holddown device 72 and 74. At this point a maximum initial angle α is defined as shown in FIG. 2. It should be appreciated that in some instance at least some peeling is achieved before the angle α reaches its maximum, i.e., before remaining structure 79 contacts one or both of the holddown devices 72 and 74.

When the remaining structure 79 contacts either one or both of the holddown devices 72 and 74 the film 22 inclines generally from the associated contact location 76 or 77 to the part 65 at an approach angle β. The approach angle β shown in FIG. 2 is defined as the angle between a line that is parallel to the surface 25 of the support structure 24 tangent to the associated contact location 76 or 77 and the line from the peel location 83 that is tangent to the associated contact location 76 or 77 and intersects the line that is parallel to the surface 25 of the support structure 24 described above. It should be appreciated that the approach angle β changes as the relative positions of the stage 14 and the holddown devices 72 and 74 change.

As shown in FIG. 2, the separation step has begun, i.e., stage 14 is in the process of moving away from the support structure 24 and contact of the remaining structure 79 and the holddown devices 72 ad 74 has occurred but peeling has begun. Referring now to FIG. 3, peeling has begun at peeling locations 83 and the remaining structure 79 has contacted the holddown devices 72 and 74. It should be appreciated that in one embodiment, the material depositor 30 is configured such that resin R is not deposited continually but instead is deposited such that a region 293 (as shown in FIG. 1) without resin is positioned under the hold down devices 72 and 74. In this embodiment hold down device 72 does not contact remaining structure 79 during a separation process.

As the stage 14 continues to move away from the support structure 24 as shown in FIG. 3, peeling continues at the peeling locations 83. As shown in FIGS. 3 and 4, the amount of peeling that occurs at the peeling locations 83 is preferably symmetrical and even. However it should be appreciated that the amount of peeling that occurs at the peeling locations 83 can be asymmetrical in that one side can peel more than the other side for a given period of time.

Figure 5:
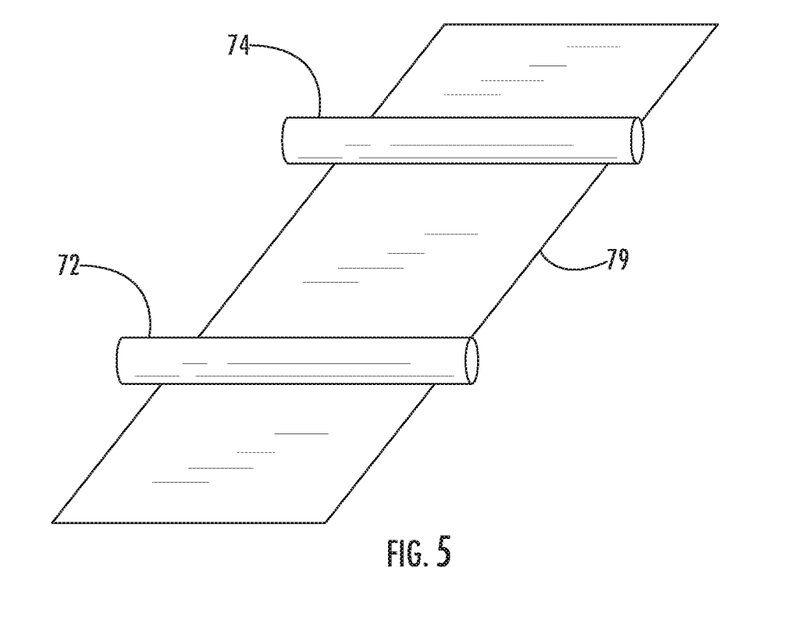
FIG. 5 is a schematic view of a pair of hold down devices according to the disclosed technology.
Figure 6:
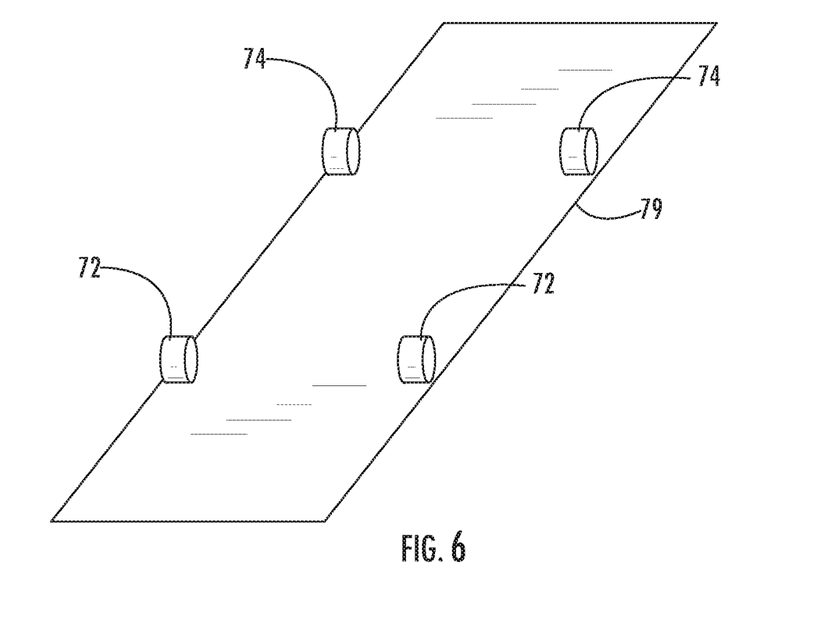
FIG. 6 is a schematic view of hold down devices according to another embodiment of the disclosed technology.

Referring now to FIG. 5, according to the illustrated embodiment, the holddown devices 72 and 74 are rollers that extend across the width of the foil 22. As shown in FIG. 6, according to an alternative embodiment, the holddown devices 72 and 74 are each comprised of a pair of short rollers or wheels that are spaced apart from each other.

Figure 7:
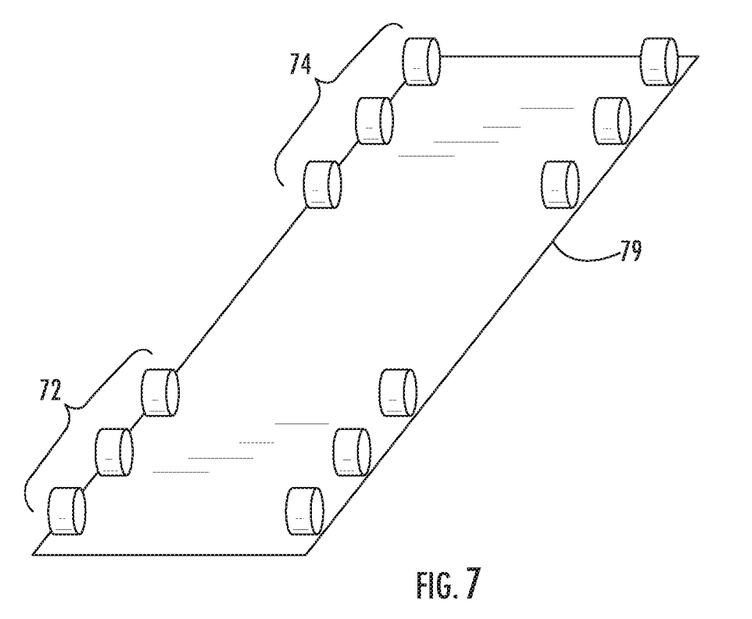
FIG. 7 is a schematic view of hold down devices according to yet another embodiment of the disclosed technology.

As shown in FIG. 7, the holddown devices 72 and 74 can be a series of rollers or wheels. It should be appreciated that the additional series of contact points can control the tension of the foil 22.

Figure 8:
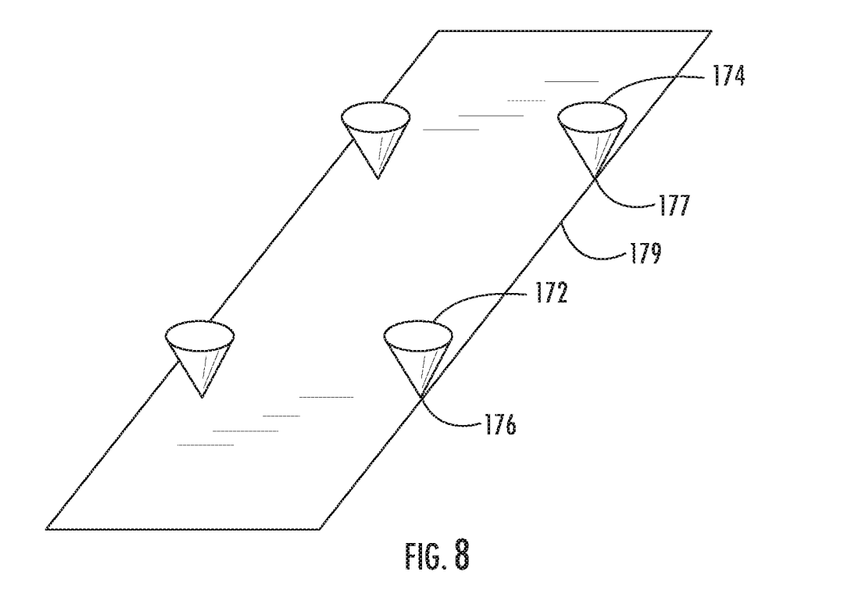
FIG. 8 is a schematic view of hold down devices according to yet another embodiment of the disclosed technology.
Figure 9:
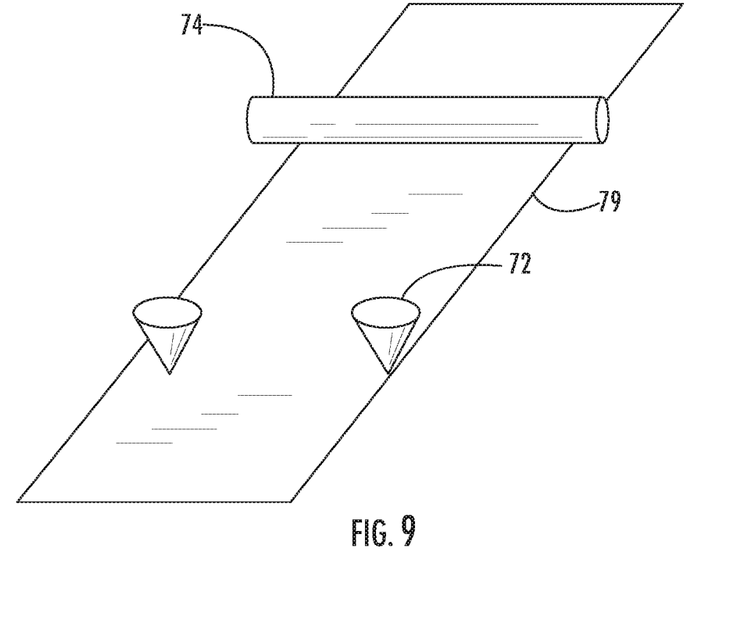
FIG. 9 is a schematic view of hold down devices according to yet another embodiment of the disclosed technology.

Referring now to FIG. 8 which shows an alternative embodiment of the disclosed technology. The following description of the alternative embodiment utilizes reference numbers in the 100 series and can be understood from a description of similar elements in the zero series described above. The alternative embodiment includes holddown devices 172 and 174. The holddown devices 172 and 174 have fixed contact locations 176 and 177 respectively. The fixed contact locations can be configured with minimal areas such as the points of cones as shown in FIG. 8. Referring now to FIG. 9, the holddown devices can include a combination of geometric configurations.

Figure 10:
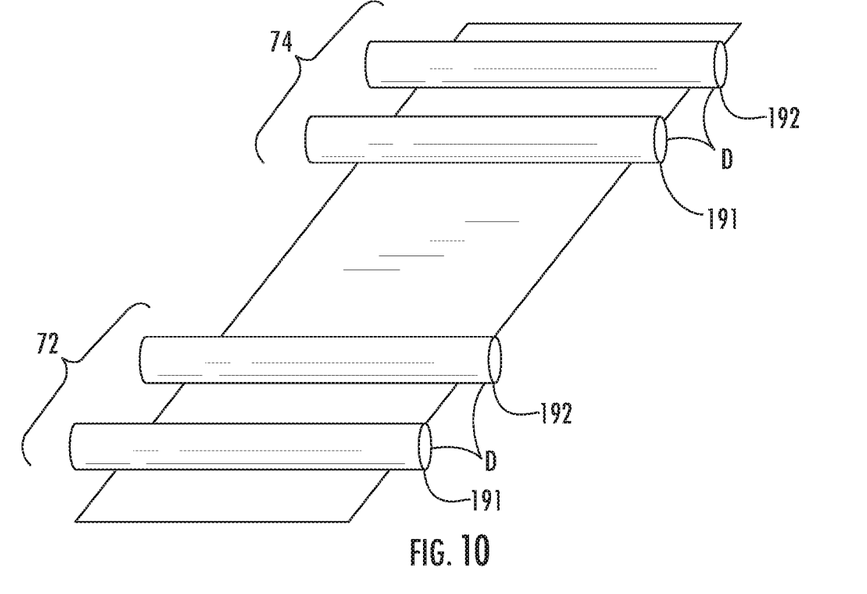
FIG. 10 is a schematic view of hold down devices according to yet another embodiment of the disclosed technology in a first position.
Figure 11:
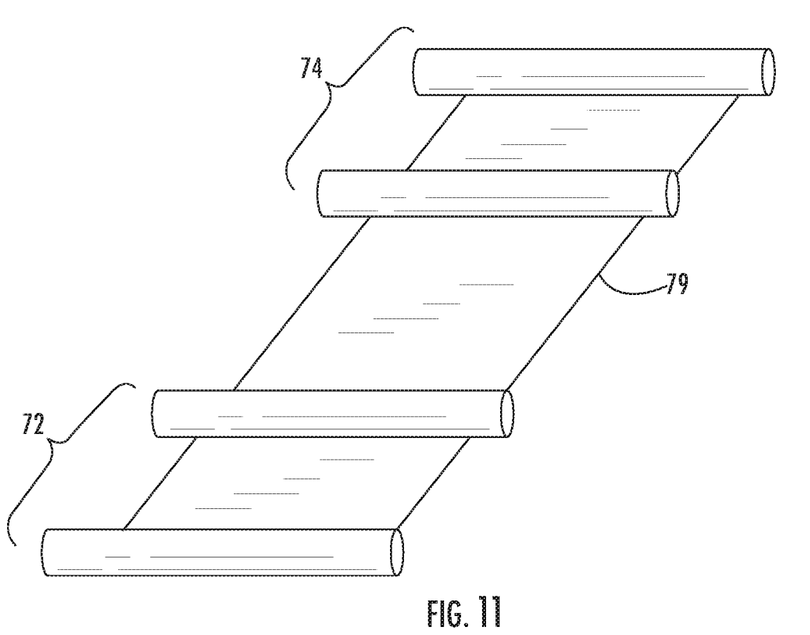
FIG. 11 is a schematic view of the hold down devices of FIG. 10.

FIGS. 10 and 11 show an alternative embodiment of the disclosed technology in which the holddown devices are provided in pairs having variable spacing. In this regard, as shown in FIG. 10, each of the holddown devices 72, 74 includes a pair of rollers 191, 192 that are spaced apart a first distance D. Each pair of rollers 191, 192 is configured to move between a first position in which they are spaced apart a first distance D and a second position in which they are spaced apart a second distance D'. The second distance D prime is greater than the first distance D. Lateral movement at least one of the rollers 191, 192 of a pair of rollers can be used to achieve the spacing differences. It should be appreciated that lateral movement of at least one roller can be used to achieve this result. It should also be appreciated that lateral movement of the holddown device 170 or the holddown device 172 can be used to change the associated approach angle β defined by the holddown device as described above. Variation of the approach angle β can be used to control the rate of peeling. In this regard, a slower rate of peeling might be preferable just prior to release from the part 65 of remaining structure 79 or at the beginning of the peeling process.

Figure 12:
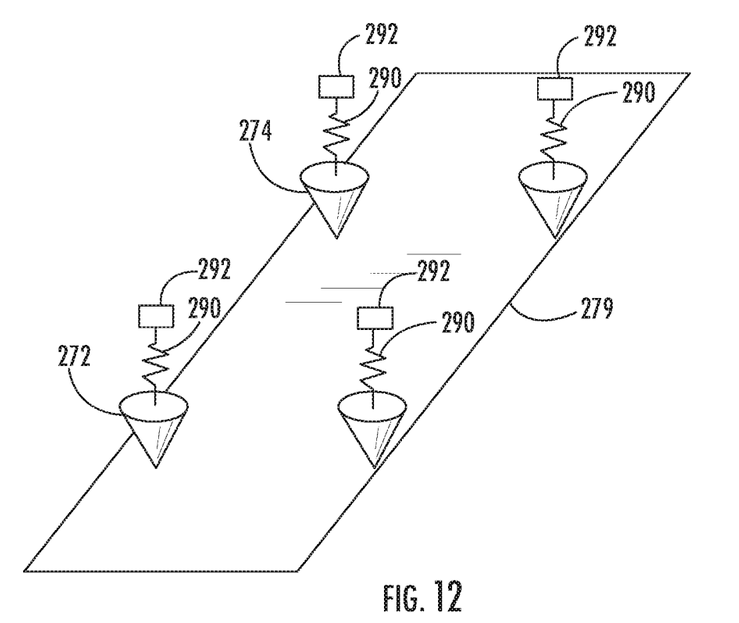
FIG. 12 is a schematic view of hold down devices according to yet another embodiment of the disclosed technology.

According to another alternative embodiment shown in FIG. 12, the holddown devices 272 and 274 are attached to a spring loaded support 290. It should be appreciated that they can also be attached to a force measuring device 292 as indicated in FIG. 12. It should also be appreciated that such a measuring device 292 can be utilized in a closed loop control system with an actuator configured into vary the force applied by the holddown device 70 to the remaining structure 79. By way of example the actuator can be configured to vary the spring force applied by spring 290. The force measured can be that applied by the stage 14 as the stage 14 moves up during the separation process, force applied by at least one of the driven rollers 20 and 21, and a combination thereof. It should be appreciated that prior to separation, a first force measured between the driven roller 20 and the part 65 and a second force measured between the driven roller 21 and the part 65 are independent of each other. In this regard, because the remaining structure 79 is attached to the part 65 which is positioned between the driven rollers 20 and 21 tension on the film 22 is applied by one of the driven rollers 20 and 21 extends between the fixed location of the film 22 at the part 65 to which it is attached and the associated driven roller 20 and 21. After separation, the tension between the driven rollers 20 and 21 are not independent and should be the sum of the tension applied the by the driven rollers 20 and 21 and the intervening drive and drive forces positioned between the driven rollers 20 and 21.

According to an alternative method, the first driven roller 20 can be utilized to affect the peel rate by controlling the tension between the part 65 and the first driven roller 20. Likewise, the second driven roller 21 can be utilized to affect the peel rate by controlling the tension between the part 65 and the second driven roller 21. In this configuration, the first driven roller 20 will be operated to apply force to the film 22 that is opposite in direction to the normal direction of travel of the film 22. And the second driven roller 21 will be operated to apply force to the film 22 that is in the same direction as the normal direction of travel of the film 22. As illustrated in FIG. 1, the normal direction of travel is from the first driven roller 20 toward the second driven roller 21.

Figure 13:
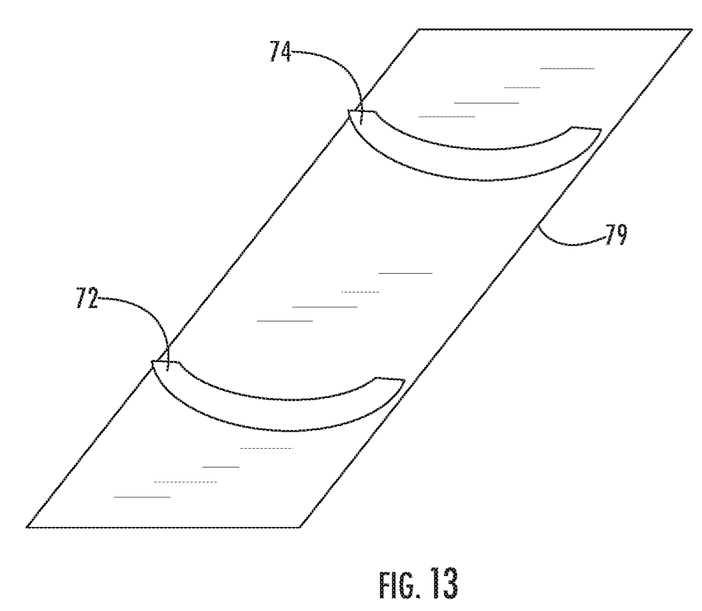
FIG. 13 is a schematic view of hold down devices according to yet another embodiment of the disclosed technology.

Referring now to FIG. 13, the holddown devices 70 can also be a variety of shapes and configurations such as bowed rollers.

Subsequent to separation and optional imaging, the build surface 26 may be cleaned or otherwise rejuvenated and prepared for re-use. For example, advancing the foil 22 provides a clean surface within the build zone 28. As the foil 22 advances, the material depositor 30 would be used to apply resin R to the build surface 26 to ready it for curing again.

After separation, the component 65 and/or the stage 14 may be cleaned to remove uncured resin R, debris, or contaminants between curing cycles. The cleaning process may be used for the purpose of removing resin R that did not cure or resin R that did not cure enough to gel during the selective curing step described above. For example, it might be desired to clean the component 65 and/or the stage 14 to ensure that no additional material or material contamination is present in the final component 65. For example, cleaning could be done by contacting the component 65 and/or the stage 14 with a cleaning fluid such as a liquid detergent or solvent.

This cycle of preparing the build surface 26, incrementing a layer, selectively curing, separating the component 65 from the build surface 26, imaging the resin R and cleaning the component 65 and/or stage 14 would be repeated as necessary until the entire component 65 is complete.

Where a scanned beam apparatus is used for the build cycle described above, instead of a projector, the radiant energy source 52 emits a build beam 56 and the beam steering apparatus 54 is used to cure the resin R by steering a focal spot of the build beam 56 over the exposed resin R in an appropriate pattern.

Optionally, a scanned beam apparatus may be used in combination with a projector. For example, a scanned beam apparatus may be used to apply radiant energy (in addition to that applied by the projector) by scanning one or multiple beams over the surface of the uncured resin R. This may be concurrent or sequential with the use of the projector.

Either curing method (projector or scanned) results in a component 65 in which the filler (if used) is held in a solid shape by the cured resin R. This component may be usable as an end product for some conditions. Subsequent to the curing step, the component 65 may be removed from the stage 14.

If the end product is intended to be composed of the filler (e.g. purely ceramic, glass, metallic, diamond, silicon, graphite, etc.), the component 65 may be treated to a conventional sintering process to burn out the resin R and to consolidate the ceramic or metallic particles. Optionally, a known infiltration process may be carried out during or after the sintering process, in order to fill voids in the component with a material having a lower melting temperature than the filler. The infiltration process improves component physical properties.

The foregoing has described a method and apparatus for separating a resin support structure from a cured layer of resin in additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Further aspects of the invention are provided by the subject matter of the following clauses:

1. An additive manufacturing apparatus configured to produce a component layer by layer, the apparatus comprising: a support structure; a stage positioned opposite the support structure and configured to hold a stacked arrangement of one or more cured layers of a resin; one or more actuators operable to move the stage away from the support structure; a radiant energy apparatus positioned opposite the stage such that the support structure is positioned between the radiant energy apparatus and the stage; the radiant energy apparatus being operable to generate and project radiant energy through the support structure on the resin in a predetermined pattern; and a foil separation device that includes at least one holddown device that is configured such that a foil contacts the at least one holddown device as the stage is moved away from the support structure in a separation process.

2. The additive manufacturing apparatus of claim 1, wherein the at least one holddown device is configured to maintain a fixed position relative to the support structure.

3. The additive manufacturing apparatus of claim 1, comprising: a first holddown device; a second holddown device; and wherein the first holddown device is configured to move relative to the second holddown device.

4. The additive manufacturing apparatus of claim 1, wherein the first holddown device and the second holddown device are configured to move relative to the support structure.

5. The additive manufacturing apparatus of claim 1, wherein the at least one holddown device is a roller.

6. The additive manufacturing apparatus of claim 1, wherein the first holddown device and the second holddown device can move between a position near the support structure and the position that is near the stage.

7. The additive manufacturing apparatus of claim 1, wherein the at least one holddown device defines a surface against which foil can slide.

8. The additive manufacturing apparatus of claim 1, wherein the at least one holddown device is a fulcrum operable to aid in separation of the foil from the cured resin layer.

9. The additive manufacturing apparatus of claim 1, wherein at least one of the first holddown device and the second holddown device is formed of a resilient material.

10. The additive manufacturing apparatus of claim 1, wherein at least one of the first holddown device and the second holddown device is formed of a hard material.

11. The additive manufacturing apparatus of claim 1, wherein the at least one holddown device is supported by a spring having a spring force.

12. The additive manufacturing apparatus of claim 11, wherein the spring force is variable.

13. The additive manufacturing apparatus of claim 1, wherein the at least one holddown device is in contact with the foil at the beginning of the separation process.

14. An additive manufacturing apparatus configured to produce a component layer by layer, the apparatus comprising: a support structure; a stage positioned opposite the support structure and configured to hold a stacked arrangement of one or more cured layers of the resin; one or more actuators operable to move the stage away from the support structure; a material depositor operable to deposit a resin that is curable onto a build surface; a radiant energy apparatus positioned opposite the stage such that the support structure is positioned between the radiant energy apparatus and the stage; a foil that extends between the support structure and the stage; a build surface that is defined by the foil and positioned such that it faces the stage; the radiant energy apparatus being operable to generate and project radiant energy through the support structure and the foil on the resin in a predetermined pattern; a foil separation device that is positioned between the stage and the support structure; and wherein the foil separation device includes a first holddown device and a second holddown device that are configured such that a remaining structure contacts the first holddown device and the second holddown device when the stage is moved away from the support structure.

15. The additive manufacturing apparatus of claim 14, wherein the foil separation device is configured to maintain a fixed position relative to the support structure.

16. The additive manufacturing apparatus of claim 14, wherein the at least one holddown device is configured to move relative to the second holddown device.

17. The additive manufacturing apparatus of claim 14, wherein the first holddown device and the second holddown device are configured to move relative to the support structure.

18. The additive manufacturing apparatus of claim 14, wherein the first holddown device and the second holddown device each includes a roller.

19. The additive manufacturing apparatus of claim 14, wherein the first holddown device and the second holddown device can move between a position near the support structure and the position that is near the stage.

20. The additive manufacturing apparatus of claim 14, wherein the at least one holddown device is configured to provide a surface against which foil can slide.

21. The additive manufacturing apparatus of claim 14, wherein the at least one holddown device is a fulcrum operable to aid in separation of the foil from the cured resin layer.

22. The additive manufacturing apparatus of claim 14, wherein at least one of the first holddown device and the second holddown device is formed of a resilient material.

23. The additive manufacturing apparatus of claim 14, wherein at least one of the first holddown device and the second holddown device is formed of a hard material.

24. The additive manufacturing apparatus of claim 14, wherein the at least one holddown device is supported by a support apparatus configured such that force applied to the holddown device can be varied.

25. The additive manufacturing apparatus of claim 24, wherein the support apparatus is a spring that has a spring force.

26. The additive manufacturing apparatus of claim 25, wherein the spring forces are variable.

27. A method of operating an additive manufacturing apparatus that includes a stage, a support structure, a foil that extends between the stage and the support structure and that defines a build surface, and a foil separation device, the method comprising the steps of: performing an additive manufacturing cycle including the following steps: depositing an uncured layer of resin onto the build surface such that it defines a resin surface; moving the stage such that a working surface contacts the resin surface; curing at least a portion of the uncured layer of resin to create a newly cured layer; and moving the stage and thus, the newly cured layer, away from the support structure; operating the foil separation device to separate the newly cured layer from the build surface.

28. The method according to claim 27, wherein the step of operating the foil separation device includes a step of changing an amount of tension that is applied to the foil downstream of the stage.

29. The method according to claim 27, wherein the step of operating the foil separation device includes a step of changing an amount of tension that is applied to the foil upstream of the stage.

30. The method according to claim 27, wherein the step of operating the foil separation device includes a step of changing an amount of tension applied to the foil upstream of the stage and the step of applying tension to the foil downstream of the stage.

31. The method according to claim 27, wherein the step of operating the foil separation device includes a step of moving a component of the separation device relative to the stage.

What is claimed is:

1. An additive manufacturing apparatus configured to produce a component layer by layer, the apparatus comprising:
   a support structure;
   a stage positioned opposite the support structure and configured to hold a stacked arrangement of one or more cured layers of a resin;
   one or more actuators operable to move the stage away from the support structure;
   a radiant energy apparatus positioned opposite the stage such that the support structure is positioned between the radiant energy apparatus and the stage;
   the radiant energy apparatus being operable to generate and project radiant energy through the support structure on the resin in a predetermined pattern;
   a resin handling assembly comprising a first driven roller and a second driven roller spaced apart with a foil extending therebetween; and
   a foil separation device that includes a first holddown device and a second holddown device configured such that the foil contacts the first holddown device and the second holddown device as the stage is moved away from the support structure in a separation process, the first holddown device and the second holddown device positioned a distance from the support structure, the distance being greater than a thickness of the foil and the cured layer.

2. The additive manufacturing apparatus of claim 1, wherein at least one of the first holddown device and the second holddown device is configured to maintain a fixed position relative to the support structure.

3. The additive manufacturing apparatus of claim 1, wherein the first holddown device is configured to move relative to the second holddown device.

4. The additive manufacturing apparatus of claim 3, wherein the first holddown device and the second holddown device are configured to move relative to the support structure.

5. The additive manufacturing apparatus of claim 1, wherein at least one of the first holddown device and the second holddown device is a roller.

6. The additive manufacturing apparatus of claim 3, wherein the first holddown device and the second holddown device can move between a position near the support structure and a position that is near the stage.

7. The additive manufacturing apparatus of claim 1, wherein at least one of the first holddown device and the second holddown device defines a surface against which the foil can slide.

8. The additive manufacturing apparatus of claim 1, wherein at least one of the first holddown device and the second holddown device is a fulcrum operable to aid in separation of the foil from the cured layer.

9. The additive manufacturing apparatus of claim 1, wherein at least one of the first holddown device and the second holddown device is supported by a spring having a spring force.

10. The additive manufacturing apparatus of claim 9, wherein the spring force is variable.

11. The additive manufacturing apparatus of claim 1, wherein at least one of the first holddown device and the second holddown device is in contact with the foil at the beginning of the separation process.

12. An additive manufacturing apparatus configured to produce a component layer by layer, the apparatus comprising:
   a support structure;
   a stage positioned opposite the support structure and configured to hold a stacked arrangement of one or more cured layers of a resin;
   one or more actuators operable to move the stage away from the support structure;
   a radiant energy apparatus positioned opposite the stage such that the support structure is positioned between the radiant energy apparatus and the stage;
   a foil that extends between the support structure and the stage;
   a material depositor operable to deposit the resin that is curable onto a build surface that is defined by the foil and positioned such that it faces the stage;
   the radiant energy apparatus being operable to generate and project radiant energy through the support structure and the foil on the resin in a predetermined pattern;
   a foil separation device that is positioned between the stage and the support structure; and
   wherein the foil separation device includes a first holddown device and a second holddown device that are configured such that a remaining structure contacts the first holddown device and the second holddown device when the stage is moved away from the support structure, the first holddown device and the second holddown device are positioned a distance from the support structure, the distance being greater than a thickness of the foil and the cured layer.

13. The additive manufacturing apparatus of claim 12, wherein the foil separation device is configured to maintain a fixed position relative to the support structure.

14. The additive manufacturing apparatus of claim 12, wherein the first holddown device is configured to move relative to the second holddown device.

15. The additive manufacturing apparatus of claim 12, wherein the first holddown device and the second holddown device are configured to move relative to the support structure.

16. The additive manufacturing apparatus of claim 12, wherein the first holddown device and the second holddown device each includes a roller.

17. The additive manufacturing apparatus of claim 12, wherein the first holddown device and the second holddown device can move between a position near the support structure and a position that is near the stage.

18. The additive manufacturing apparatus of claim 12, wherein the first holddown device is configured to provide a surface against which the foil can slide.

19. The additive manufacturing apparatus of claim 12, wherein the first holddown device is a fulcrum operable to aid in separation of the foil from the cured layer.

20. The additive manufacturing apparatus of claim 12, wherein at least one of the first holddown device and the second holddown device is formed of a hard material.

21. The additive manufacturing apparatus of claim 12, wherein the first holddown device is supported by a support apparatus configured such that force applied to the first holddown device can be varied.

22. The additive manufacturing apparatus of claim 21, wherein the support apparatus is a spring that has a spring force.

23. A method of operating an additive manufacturing apparatus that includes a stage, a support structure, a foil that extends between the stage and the support structure and that defines a build surface, a resin handling assembly, and a foil separation device, the method comprising the steps of:
   performing an additive manufacturing cycle including the following steps:
   depositing an uncured layer of resin onto the build surface such that it defines a resin surface;
   moving the stage such that a working surface contacts the resin surface;
   curing at least a portion of the uncured layer of resin to create a newly cured layer;
   moving the stage and thus, the newly cured layer, away from the support structure; and
   operating the foil separation device to separate the newly cured layer from the build surface,
   wherein the foil separation device includes a first holddown device and a second holddown device that are configured such that a remaining structure contacts the first holddown device and the second holddown device when the stage is moved away from the support structure, the first holddown device and the second holddown device are positioned a distance from the support structure, the distance being greater than a thickness of the foil and the cured layer.

24. The method according to claim 23, wherein the step of operating the foil separation device includes a step of changing an amount of tension that is applied to the foil downstream of the stage.

25. The method according to claim 23, wherein the step of operating the foil separation device includes a step of changing an amount of tension that is applied to the foil upstream of the stage.

26. The method according to claim 23, wherein the step of operating the foil separation device includes a step of changing an amount of tension applied to the foil upstream of the stage and the step of applying tension to the foil downstream of the stage.

27. The method according to claim 23, wherein the step of operating the foil separation device includes a step of moving a component of the foil separation device relative to the stage.

* * * * *